US010714742B2

(12) United States Patent
Kim et al.

(10) Patent No.: US 10,714,742 B2
(45) Date of Patent: Jul. 14, 2020

(54) CATHODE ACTIVE MATERIAL INCLUDING LITHIUM TRANSITION METAL PHOSPHATE PARTICLES, PREPARATION METHOD THEREOF, AND LITHIUM SECONDARY BATTERY INCLUDING THE SAME

(71) Applicant: LG Chem, Ltd., Seoul (KR)

(72) Inventors: Ji Hye Kim, Daejeon (KR); Wang Mo Jung, Daejeon (KR); Sang Seung Oh, Daejeon (KR); Byung Chun Park, Daejeon (KR); Sung Bin Park, Daejeon (KR)

(73) Assignee: LG Chem, Ltd. (KR)

( * ) Notice: Subject to any disclaimer, the term of this patent is extended or adjusted under 35 U.S.C. 154(b) by 258 days.

(21) Appl. No.: 15/833,142

(22) Filed: Dec. 6, 2017

(65) Prior Publication Data

US 2018/0097226 A1 Apr. 5, 2018

Related U.S. Application Data

(60) Division of application No. 14/519,500, filed on Oct. 21, 2014, now Pat. No. 9,871,246, which is a continuation of application No. PCT/KR2014/007577, filed on Aug. 14, 2014.

(30) Foreign Application Priority Data

Aug. 28, 2013 (KR) ........................ 10-2013-0102173

(51) Int. Cl.
| | |
|---|---|
| *H01M 4/04* | (2006.01) |
| *H01M 4/136* | (2010.01) |
| *H01M 4/36* | (2006.01) |
| *H01M 4/58* | (2010.01) |
| *H01M 4/62* | (2006.01) |
| *H01M 10/052* | (2010.01) |
| *H01M 4/1397* | (2010.01) |

(52) U.S. Cl.
CPC ......... *H01M 4/366* (2013.01); *H01M 4/0404* (2013.01); *H01M 4/0419* (2013.01); *H01M 4/0435* (2013.01); *H01M 4/0471* (2013.01); *H01M 4/136* (2013.01); *H01M 4/362* (2013.01); *H01M 4/5825* (2013.01); *H01M 4/625* (2013.01); *H01M 4/1397* (2013.01); *H01M 10/052* (2013.01)

(58) Field of Classification Search
CPC .. H01M 4/0404; H01M 4/0435; H01M 4/049; H01M 4/126; H01M 4/362; H01M 4/366; H01M 4/5825; H01M 4/625
See application file for complete search history.

(56) References Cited

U.S. PATENT DOCUMENTS

| | | |
|---|---|---|
| 5,993,988 A | 11/1999 | Ohara et al. |
| 2010/0056357 A1 | 3/2010 | Loutfy et al. |
| 2010/0099027 A1 | 4/2010 | Kikuya et al. |
| 2010/0203388 A1 | 8/2010 | Kim et al. |
| 2010/0233540 A1 | 9/2010 | Choy et al. |
| 2010/0310934 A1 | 12/2010 | Yang et al. |
| 2011/0163272 A1* | 7/2011 | Ono ..................... H01M 4/0416 252/500 |
| 2012/0064408 A1 | 3/2012 | Song et al. |
| 2012/0231334 A1 | 9/2012 | Kinoshita et al. |
| 2012/0258362 A1* | 10/2012 | Mah ....................... H01M 4/134 429/221 |
| 2012/0258366 A1 | 10/2012 | Yu et al. |
| 2013/0209879 A1 | 8/2013 | Nagai et al. |
| 2013/0216902 A1 | 8/2013 | Choy et al. |

FOREIGN PATENT DOCUMENTS

| | | |
|---|---|---|
| CN | 101333650 A | 12/2008 |
| CN | 101908626 A | 12/2010 |
| CN | 102640332 A | 8/2012 |
| CN | 102683700 A | 9/2012 |
| CN | 102893432 A | 1/2013 |
| EP | 2285740 A1 | 2/2011 |
| JP | 60158547 A | 8/1985 |
| JP | 2008251532 A | 10/2008 |
| KR | 100809570 B1 | 3/2008 |
| KR | 2010-0044713 A | 4/2010 |

(Continued)

OTHER PUBLICATIONS

International Search Report from PCT/KR2014/007577 dated Nov. 25, 2014.
Supplemental search report from European Appln. No. EP 14 81 4653, dated Jul. 16, 2015.
Huiqiao Li et al., "Enhancing the performances of Li-ion batteries by carbon-coating: present and future," Chemical Communications, vol. 48, No. 9, Jan. 1, 2012, pp. 1201-1217, XP055049890.
Extended Search Report from European Application No. 14814653. 3, dated Nov. 10, 2015.
Office Action from Chinese Application No. 201480001943.4, dated May 24, 2016.
Machine translation of JP 60-158547, published on Aug. 19, 1985.

*Primary Examiner* — Anca Eoff
(74) *Attorney, Agent, or Firm* — Lerner, David, Littenberg, Krumholz & Mentlik, LLP

(57) ABSTRACT

Provided are a cathode active material including lithium transition metal phosphate particles, including a first secondary particle formed by agglomeration of two or more first primary particles, and a second secondary particle formed by agglomeration of two or more second primary particles in the first secondary particle, and a method of preparing the same.
Since the cathode active material may include first and second primary particles having different average particle diameters, the exfoliation of the cathode active material from a cathode collector may be minimized and performance characteristics, such as high output characteristics and an increase in available capacity, of a secondary battery may be further improved.

14 Claims, 1 Drawing Sheet

(56) References Cited

FOREIGN PATENT DOCUMENTS

| | | | |
|---|---|---|---|
| KR | 2010-0131252 A | 12/2010 | |
| KR | 20110008218 A | 1/2011 | |
| KR | 2012-0114955 A | 10/2012 | |
| KR | 20130072379 A | 7/2013 | |
| TW | 201208187 A | 2/2012 | |
| WO | 2009057834 A1 | 5/2009 | |
| WO | 2009/127674 A1 | 10/2009 | |
| WO | 2012042727 A1 | 4/2012 | |
| WO | 2012049777 A1 | 4/2012 | |
| WO | WO 2014/063244 | * | 5/2014 |

* cited by examiner

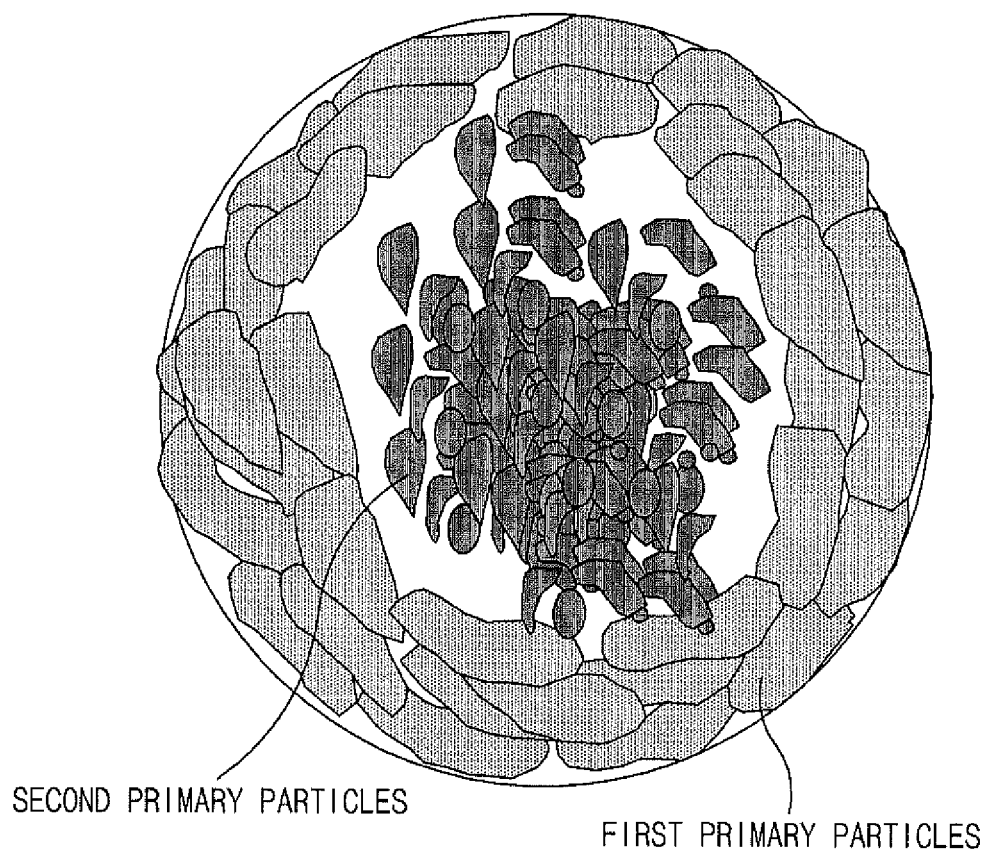

CATHODE ACTIVE MATERIAL INCLUDING LITHIUM TRANSITION METAL PHOSPHATE PARTICLES, PREPARATION METHOD THEREOF, AND LITHIUM SECONDARY BATTERY INCLUDING THE SAME

CROSS-REFERENCE TO RELATED APPLICATIONS

The present application is a divisional of U.S. patent application Ser. No. 14/519,500, filed on Oct. 21, 2014, which is a continuation of International Application No. PCT/KR2014/007577 filed Aug. 14, 2014, which claims priority from Korean Application No. 10-2013-0102173 filed Aug. 28, 2013, all of which are incorporated herein by reference.

TECHNICAL FIELD

The present invention relates to a cathode active material including lithium transition metal phosphate particles, a preparation method thereof, and a lithium secondary battery including the cathode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

A carbon material has been mainly used as an anode active material of these lithium secondary batteries, and the use of lithium metal, a sulfur compound, a silicon compound, and a tin compound has also been in consideration. Also, lithium-containing cobalt oxide ($LiCoO_2$) has been mainly used as a cathode active material, and in addition, the use of lithium-containing manganese oxide, such as layered structure $LiMnO_2$ and spinel structure $LiMn_2O_4$, and lithium-containing nickel oxide ($LiNiO_2$) has also been in consideration.

Since $LiCoO_2$ has excellent various properties such as cycle characteristics, $LiCoO_2$ has currently been widely used. However, $LiCoO_2$ has low safety, is expensive as a raw material due to the resource limit of cobalt, and has limitations in being largely used as a power source for various applications such as electric vehicles. $LiNiO_2$ may have difficulty in being used in an actual mass production process at a reasonable cost due to the characteristics according to the manufacturing method thereof, and lithium manganese oxides, such as $LiMnO_2$ and $LiMn_2O_4$, may have poor cycle characteristics.

Thus, a method of using lithium transition metal phosphate as a cathode active material has recently been studied. Lithium transition metal phosphate is broadly classified into NASICON-structured $Li_xM_2(PO_4)_3$ and olivine-structured $LiMPO_4$, and is studied as a material having excellent high-temperature safety in comparison to typical $LiCoO_2$. Currently, $Li_3V_2(PO_4)_3$ has been known among NASICON-structured compounds, and $LiFePO_4$ and $Li(Mn,Fe)PO_4$ have been most widely studied among olivine-structured compounds.

In particular, since $LiFePO_4$, as a material having a voltage of about 3.5 V vs. lithium, a high bulk density of 3.6 g/cm$^3$, and a theoretical capacity of 170 mAh/g, among the olivine-structured compounds has better high-temperature stability than cobalt (Co) and uses inexpensive iron (Fe) as a raw material, it is highly possible for $LiFePO_4$ to be used as a cathode active material for a lithium secondary battery in the future.

However, since $LiFePO_4$ has the following limitations, $LiFePO_4$ has limitations in commercialization.

First, since $LiFePO_4$ has low electrical conductivity, the internal resistance of a battery may increase when the $LiFePO_4$ is used as a cathode active material. As a result, polarization potential increases when a battery circuit is closed, and thus, battery capacity may be reduced.

Second, since $LiFePO_4$ has a lower density than a typical cathode active material, there is a limitation that the energy density of the battery may not be sufficiently increased.

Third, since an olivine crystal structure in a state in which lithium is deintercalated is very unstable, a movement path of lithium ions is obstructed by a portion in which lithium is removed from the surface of a crystal. Thus, the intercalation/deintercalation of lithium may be delayed.

Therefore, a technique has been proposed in which a discharge capacity is increased by decreasing the moving distance of lithium ion by reducing the diameter of the olivine crystals to a nanoscale level.

However, in the case that an electrode is prepared by using olivine particles having a fine particle size, exfoliation from a cathode collector may be facilitated due to a spring back phenomenon, and a large amount of a binder must be used in order to reduce the exfoliation.

However, in the case in which the large amount of binder is used, resistance may increase and voltage may decrease. Also, the mixing time of a cathode active material composition may increase, and thus, process efficiency may decrease.

PRIOR ART DOCUMENTS

Patent Document

KR 0809570 B1

DISCLOSURE OF THE INVENTION

Technical Problem

Accordingly, the present invention is provided to solve the foregoing problems.

An aspect of the present invention provides a cathode active material including lithium transition metal phosphate capable of simultaneously improving adhesion to a cathode collector and high output characteristics.

Another aspect of the present invention provides a method of preparing the cathode active material which may improve the processability of an electrode during cathode preparation.

Another aspect of the present invention provides a cathode including the cathode active material and a method of preparing the cathode.

Another aspect of the present invention provides a lithium secondary battery including the cathode.

Technical Solution

According to an aspect of the present invention, there is provided a cathode active material including lithium transition metal phosphate particles represented by Chemical Formula 1, wherein the lithium transition metal phosphate particles include a first secondary particle formed by agglomeration of two or more first primary particles; and a second secondary particle formed by agglomeration of two or more second primary particles in the first secondary particle:

$$Li_{1+a}M1_{1-x}M2_x(PO_{4-b})X_b \qquad \text{Chemical Formula 1}$$

in Chemical Formula 1,

M1 represents at least one element selected from the group consisting of iron (Fe), manganese (Mn), cobalt (Co), nickel (Ni), copper (Cu), zinc (Zn), and magnesium (Mg);

M2 represents at least one element selected from Groups 2 to 15 elements excluding M1;

X represents at least one element selected from the group consisting of fluorine (F), sulfur (S), and nitrogen (N); and $$-0.5 \leq a \leq +0.5,\ 0 \leq x \leq 0.5,\ \text{and}\ 0 \leq b \leq 0.1.$$

According to another aspect of the present invention, there is provided a method of preparing a cathode active material including: (i) preparing second secondary particles of lithium transition metal phosphate by primary spray drying and primary sintering a first spray solution including first lithium transition metal phosphate, a first carbon precursor, and water in a spray chamber; and (ii) preparing first secondary particles of lithium transition metal phosphate respectively including the second secondary particle therein by secondary spray drying and secondary sintering a second spray solution including the second secondary particles, second lithium transition metal phosphate, a second carbon precursor, and water in a spray chamber.

According to another aspect of the present invention, there is provided a cathode including the cathode active material.

According to another aspect of the present invention, there is provided a method of preparing a cathode including: forming a cathode active material coating layer by coating a cathode collector with a cathode active material composition comprising the cathode active material and a binder mixed therein and drying the cathode collector; and rolling the cathode active material coating layer.

According to another aspect of the present invention, there is provided a lithium secondary battery including the cathode, an anode, and a separator disposed between the cathode and the anode.

Advantageous Effects

In a cathode active material according to an embodiment of the present invention, since first primary particles and second primary particles having different average particle diameters are included, the exfoliation of the cathode active material from a cathode collector may be minimized and performance characteristics, such as high output characteristics and an increase in available capacity, of a secondary battery may be further improved.

In addition, the first secondary particles are porous, the secondary particles are collapsed and fractured due to rolling when used in a cathode. Thus, a spring back phenomenon may be reduced, and as a result, adhesion and processability may be further improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

The FIGURE is a schematic cross-sectional view illustrating a cathode active material according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A cathode active material according to an embodiment of the present invention includes lithium transition metal phosphate particles represented by the following Chemical Formula 1, wherein the lithium transition metal phosphate particles include a first secondary particle formed by agglomeration of two or more first primary particles, and a second secondary particle formed by agglomeration of two or more second primary particles in the first secondary particle:

$$Li_{1+a}M1_{1-x}M2_x(PO_{4-b})X_b \qquad \text{Chemical Formula 1}$$

in Chemical Formula 1,

M1 represents at least one element selected from the group consisting of iron (Fe), manganese (Mn), cobalt (Co), nickel (Ni), copper (Cu), zinc (Zn), and magnesium (Mg);

M2 represents at least one element selected from Groups 2 to 15 elements excluding M1;

X represents at least one element selected from the group consisting of fluorine (F), sulfur (S), and nitrogen (N); and $$-0.5 \leq a \leq +0.5,\ 0 \leq x \leq 0.5,\ \text{and}\ 0 \leq b \leq 0.1.$$

The present invention is for providing a cathode active material including lithium transition metal phosphate which may simultaneously improve adhesion to a cathode collector and high output characteristics.

In general, lithium transition metal phosphate having a small average particle diameter is required for a high-output cathode active material including lithium transition metal phosphate. However, in the case that the cathode active material is composed of only the lithium transition metal phosphate having a small average particle diameter, the adhesion to the cathode collector may be reduced.

In contrast, lithium transition metal phosphate having a large average particle diameter may improve the adhesion. However, since electrical conductivity of the lithium transition metal phosphate having a large average particle diameter may be low, internal resistance of a battery may increase at high output levels when the lithium transition metal phosphate having a large average particle diameter is used as a cathode active material.

Thus, the present invention is for simultaneously addressing the above limitations.

That is, as illustrated in a schematic cross-sectional view of the FIGURE, lithium transition metal phosphate particles according to an embodiment of the present invention include a first secondary particle formed by agglomeration of two or more first primary particles, and a second secondary particle formed by agglomeration of two or more second primary particles in the first primary particle.

According to an embodiment of the present invention, the first primary particles and the second primary particles may have different average particle diameters ($D_{50}$) for improving high output characteristics and capacity characteristics of the secondary battery.

The average particle diameter of the first primary particle may be greater than the average particle diameter of the second primary particle.

That is, in the particles of the cathode active material according to the embodiment of the present invention, the average particle diameter of the first primary particles constituting the first secondary particle that may be in contact with the cathode collector may be in a range of 200 nm to 500 nm. In order to increase the output characteristics and available capacity, the average particle diameter of the second primary particles constituting the second secondary particle that is formed in the first secondary particle may be relatively smaller than that of the first primary particle, and for example, the average particle diameter thereof may be less than 50 nm, preferably, in a range of 10 nm to 45 nm.

In the case that the average particle diameter of the first primary particles is excessively small, that is, less than 200 nm, the adhesion may decrease and thus, process efficiency may not be obtained. In the case in which the average particle diameter of the first primary particles is greater than 500 nm, formability of the lithium transition metal phosphate particles may be reduced and granulation may be difficult to be controlled.

In the case that the average particle diameter of the second primary particles is greater than 50 nm, the improvement of high output characteristics as desired in the present invention may be difficult.

Also, an average particle diameter of the first secondary particle formed by the agglomeration of the first primary particles may be in a range of 15 μm to 30 μm, and an average particle diameter of the second secondary particle formed by the agglomeration of the second primary particles may be in a range of 5 μm to 10 μm.

In the case that the average particle diameter of the first secondary particle is greater than 30 μm, since the mixing time for a uniform electrode process may be excessively required, it may be difficult to obtain uniformity in the preparation of the electrode. In contrast, in the case in which the average particle diameter of the first secondary particle is excessively small, that is, less than 15 μm, process efficiency may not be obtained.

In the present invention, the average particle diameter ($D_{50}$) of the particles may be defined as a particle diameter at 50% in a cumulative particle diameter distribution. The average particle diameter ($D_{50}$) of the particles according to the embodiment of the present invention, for example, may be measured by using a laser diffraction method. The laser diffraction method may generally measure a particle diameter ranging from a submicron level to a few mm, and may obtain highly repeatable and high resolution results.

Also, according to an embodiment of the present invention, the first secondary particle may be porous as illustrated in the FIGURE. That is, the second primary particles may be formed in a shape in which the second primary particles are agglomerated in the first secondary particle, preferably in the core of the particle, and a porous portion (hollow portion) may be included between the first primary particles and the second primary particles.

In the case that the first secondary particle is not porous and the first secondary particle and the second secondary particle are densely formed to constitute the cathode active material, a spring back phenomenon of the secondary particle may occur when the cathode active material is used in a cathode.

Herein, the expression "spring back phenomenon" denotes an elastic phenomenon in which an object attempts to restore its original state when the object is deformed by applying a pressure and the pressure is then removed.

That is, in the case that a cathode is prepared by coating a cathode collector with a cathode active material composition including lithium transition metal phosphate particles and rolling the cathode collector, the spring back phenomenon for recovering the original shape of spherical secondary particles may occur after the rolling when the first secondary particle and second secondary particle of the lithium transition metal phosphate particles are dense, and as a result, pores (gaps) between the particles may be formed. Since the adhesion to the cathode collector may be reduced due to the formation of the pores, exfoliation may occur. Also, since the pores may function as resistance, electrical conductivity of the electrode may decrease.

In order to address the above limitations, a large amount of a binder must be used. However, when the large amount of binder is used, resistance may increase and voltage may decrease.

Since the first secondary particle of the cathode active material according to the embodiment of the present invention is porous, in particular, the porous portion is formed between the first primary particles and the second primary particles, the first secondary particle and the second secondary particle of the cathode active material are collapsed and fractured during the rolling process when the cathode active material is used in the cathode. Thus, the shape of the secondary particles may disappear and the secondary particles may become primary particles. Accordingly, the spring back phenomenon may be reduced and as a result, the adhesion and process efficiency may be improved.

According to an embodiment of the present invention, an internal porosity of the cathode active material may be in a range of 30% to 40%.

In the case that the internal porosity of the cathode active material is less than 30%, since a space may be insufficient in which the secondary particles are collapsed due to the porosity during the rolling process of the electrode to become primary particles, the desired effect of the present invention cannot be obtained. In the case in which the internal porosity of the cathode active material is greater than 40%, a volume of the battery may be increased due to the relatively increased volume of the electrode, and as a result, capacity per volume may decrease.

According to an embodiment of the present invention, the internal porosity of the cathode active material may be defined below:

$$\text{Internal porosity} = \text{volume of pores per unit mass} / (\text{specific volume} + \text{volume of pores per unit mass})$$

The measurement of the internal porosity is not particularly limited. According to an embodiment of the present invention, the internal porosity, for example, may be measured by using absorption gas, such as nitrogen, and BEL-SORP (BET instrument) by BEL Japan, Inc.

The lithium transition metal phosphate according to the embodiment of the present invention has an olivine-type structure and may be an oxide represented by Chemical Formula 1.

Also, the lithium transition metal phosphate may be lithium iron phosphate represented by Chemical Formula 2 below and for example, may be LiFePO$_4$:

                                    Chemical Formula 2 in Chemical Formula 2,

M represents at least one selected from the group consisting of aluminum (Al), Mg, Ni, Co, Mn, titanium (Ti), gallium (Ga), Cu, vanadium (V), niobium (Nb), Zirconium (Zr), cerium (Ce), indium (In), Zn, and yttrium (Y), X represents at least one selected from the group consisting of F, S, and N, and $$-0.5 \leq a \leq +0.5,\ 0 \leq x \leq 0.5,\ \text{and}\ 0 \leq b \leq 0.1.$$

The cathode active material according to the embodiment of the present invention may further include a carbon coating layer on the first primary particles and the second primary particles, and as a result, the electrical conductivity may be further improved.

The carbon coating layer may include saccharides, and the saccharides may be obtained using any one selected from the group consisting of glucose, fructose, galactose, sucrose, maltose, and lactose, or a mixture of two or more thereof.

A thickness of the carbon coating layer is in a range of 5 nm to 100 nm and may be in a range of 5 nm to 50 nm. In the case that the thickness of the carbon coating layer is less than 5 nm, an effect of increasing the electrical conductivity due to the carbon coating layer may be insignificant. In contrast, in the case in which the thickness of the carbon coating layer is greater than 100 nm, mobility of lithium ions is reduced, and thus, the resistance may increase.

In the cathode active material according to the embodiment of the present invention, an amount of carbon included in the carbon coating layer is in a range of 2 wt % to 70 wt %, may be in a range of 3 wt % to 50 wt %, and for example, may be in a range of 4 wt % to 40 wt % based on a total weight of the cathode active material.

In the case that the amount of carbon is greater than wt %, since a thick coating layer is formed due to the excessive amount of carbon, an additional irreversible reaction may occur. Thus, a discharge capacity may be significantly decreased. In contrast, in the case in which the amount of carbon is less than 2 wt %, since the carbon coating layer may become excessively thin, the effect of increasing the electrical conductivity may be insignificant. When the carbon coating layer is further included, the cathode active material may be coated with the carbon coating layer by being surrounded by the carbon coating layer.

In order to obtain excellent electrical conductivity, stability of crystal structure, and high bulk density even in the case in which the first secondary particle and the second secondary particle are collapsed to return to the primary particles during the preparation of the cathode in the present invention, it is desirable to form the first and second secondary particles by using first and second primary particles in a crystallized state. That is, the primary particles may each independently have an olivine-type crystal structure.

Also, in terms of facilitating the return to the first and second primary particles while the first and second secondary particles are collapsed, the primary particles may form the secondary particles by agglomeration due to physical bonds, such as van der Waals forces, instead of chemical bonds such as covalent bonds or ionic bonds.

A method of preparing the cathode active material according to an embodiment of the present invention may include (i) preparing second secondary particles of lithium transition metal phosphate by primary spray drying and primary sintering a first spray solution including first lithium transition metal phosphate, a first carbon precursor, and water in a spray chamber; and (ii) preparing first secondary particles of lithium transition metal phosphate respectively including the second secondary particle therein by secondary spray drying and secondary sintering a second spray solution including the second secondary particles, second lithium transition metal phosphate, a second carbon precursor, and water in a spray chamber.

According to an embodiment of the present invention, in the cathode active material, the secondary particles of the lithium transition metal phosphate particles may be formed by a separate granulation process after the preparation of the primary particles. Also, the secondary particles may be prepared by a method of forming primary particles and simultaneously agglomerating the primary particles though a single process.

Hereinafter, the method of preparing the cathode active material according to the embodiment of the present invention will be described using a spray drying method as an example.

When the method of preparing the cathode active material according to the embodiment of the present invention is specifically examined, step (i) may be a step of preparing second secondary particles of lithium transition metal phosphate, wherein a first spray solution including first lithium transition metal phosphate, a first carbon precursor, and water is subjected to primary spray drying and primary sintering in a spray chamber to prepare the second secondary particles of lithium transition metal phosphate.

Specifically, the lithium transition metal phosphate is an oxide of Chemical Formula 1, may be an oxide of Chemical Formula 2, and for example, may be LiFePO$_4$.

The lithium transition metal phosphate may be prepared using a method typically used in the art, and for example, may be prepared by mixing a lithium-containing precursor and a transition metal-containing precursor.

The lithium-containing precursor may be any one selected from the group consisting of Li$_2$CO$_3$, Li(OH), Li(OH)·H$_2$O, and LiNO$_3$, or a mixture of two or more thereof.

A precursor that is typically used and contains transition metal may be used as the lithium-containing precursor, and in particular, the lithium-containing precursor may include an iron (Fe)-containing precursor and a phosphorous (P)-containing precursor.

The Fe-containing precursor is a ferrous compound and may be any one selected from the group consisting of FeSO$_4$, FeSO$_4$·7H$_2$O, FeC$_2$O$_4$·2H$_2$O, and FeCl$_2$, or a mixture of two or more thereof.

The P-containing precursor may be any one selected from the group consisting of H$_3$PO$_4$, NH$_4$H$_2$PO$_4$, (NH$_4$)$_2$HPO$_4$, and P$_2$O$_5$, or a mixture of two or more thereof.

Also, an alkalizing agent may be further included to adjust a pH value during the preparation of the lithium transition metal phosphate precursor. The alkalizing agent may be any one selected from the group consisting of alkali metal hydroxides, alkaline earth metal hydroxides, and ammonia compounds, or a mixture of two or more thereof.

A typically used spray dryer may be used as the above spray dryer, and for example, an ultrasonic spray dryer, an air nozzle spray dryer, an ultrasonic nozzle spray dryer, a filter expansion aerosol generator, or an electrostatic spray dryer may be used. However, the present invention is not limited thereto.

According to an embodiment of the present invention, the first lithium transition metal phosphate may be used in an amount of 5 parts by weight to 40 parts by weight based on 100 parts by weight of the water.

The spray solution may be sprayed through a disc rotating at a high speed in the chamber, and the spraying and the drying may be performed in the same chamber.

Also, according to an embodiment of the present invention, since the first spray solution may include the first carbon precursor as well as the first lithium transition metal phosphate and water in step (i), a carbon coating layer may be further included on the second primary particles.

Saccharides, for example, may be used as the first carbon precursor according to an embodiment of the present invention, and specific examples of the saccharides may be any one selected from the group consisting of glucose, fructose, galactose, sucrose, maltose, and lactose, or a mixture of two or more thereof.

According to an embodiment of the present invention, in the method of preparing the cathode active material, a total solid content (TSC) of the second secondary particles may be in a range of 25% to 40%.

In the present invention, the expression "total solid content (TSC)" denotes a solid material remained after evaporation of water in a total weight of the spray solution including the lithium transition metal phosphate and water, that is, a value that is obtained by converting the secondary particles obtained after the drying to a percentage.

According to an embodiment of the present invention, in the case that the TSC is less than 25%, the average particle diameter of the second secondary particles may decrease and productivity may decrease. In the case in which the TSC is greater than 40%, there may be limitations in the control of the average particle diameter of the secondary particles and the preparation of the electrode.

The TSC of the lithium transition metal phosphate particles may be realized by controlling spray drying conditions, for example, flow and flow rate of carrier gas, sintering temperature, retention time in a reactor, and internal pressure.

Also, according to an embodiment of the present invention, the spray drying temperature and sintering temperature may be important for controlling the degree of porosity.

According to an embodiment of the present invention, the primary spray drying may be performed in a temperature range of 20° C. to 350° C., but it is advantageous to perform the primary spray drying at a temperature as low as possible for the densification of the second secondary particles.

Furthermore, the primary sintering may be performed in a temperature range of 150° C. to 300° C. The sintering, for example, may be performed in an atmosphere of an inert gas such as argon (Ar) or nitrogen ($N_2$).

In the method of preparing the cathode active material according to the embodiment of the present invention, step (ii) may be a step of preparing first secondary particles respectively including the second secondary particle therein, wherein a second spray solution including the second secondary particles, second lithium transition metal phosphate, a second carbon precursor, and water is subjected to secondary spray drying and secondary sintering in a spray chamber to prepare the first secondary particles of lithium transition metal phosphate respectively including the second secondary particle therein.

According to an embodiment of the present invention, a ratio of the second secondary particles to the second lithium transition metal phosphate is in a range of 1:0.3 to 1:5 as a weight ratio, and may be in a range of 1:0.5 to 1:2 as a weight ratio. In the case that the amount of the second secondary particles used is less than the above range, the adhesion to the electrode may decrease, and in the case in which the amount of the second secondary particles used is greater than the above range, electrode resistance may increase and output may decrease.

Also, the second lithium transition metal phosphate may be used in an amount of 1 part by weight to 20 parts by weight based on 100 parts by weight of the water.

The second spray solution may be sprayed through a disc rotating at a high speed in the chamber, and the spraying and the drying may be performed in the same chamber.

According to an embodiment of the present invention, a flow rate of the second spray solution may be in a range of 10 ml/min to 90 ml/min. In the case that the flow rate is less than 10 ml/min, a clogging phenomenon during the introduction of the second spray solution into the spray dryer and a decrease in productivity may occur. In the case in which the flow rate is greater than 90 ml/min, the lithium transition metal particles may not be dried due to water condensation in the spray dryer.

Also, according to an embodiment of the present invention, since the second spray solution may include the second carbon precursor as well as the second lithium transition metal phosphate and water in step (ii), a carbon coating layer may be further included on the first primary particles.

The saccharides described in the case of the first carbon precursor may be used as the second carbon precursor according to an embodiment of the present invention, and the second carbon precursor may be used in an amount of 1 part by weight to 40 parts by weight based on 100 parts by weight of the lithium transition metal phosphate. In this case, the type and used amount of the first carbon precursor and the second carbon precursor may be the same or different from each other.

According to an embodiment of the present invention, in the method of preparing the cathode active material, a TSC of the first secondary particles may be in a range of 10% to 20%.

Since the range of the TSC of the first secondary particles is satisfied, the first secondary particle may be porous, and the second primary particles may be formed in a shape in which the second primary particles are agglomerated in the first secondary particle, preferably in the core of the particle.

According to an embodiment of the present invention, in the case that the TSC is less than 10%, the average particle diameter of the secondary particles may decrease and the productivity may decrease. In the case in which the TSC is greater than 20%, there may be limitations in the productivity while the average particle diameter of the secondary particles increases.

The TSC of the second lithium transition metal phosphate and the first secondary particles may be realized by controlling spray drying conditions, for example, flow and flow rate of carrier gas, sintering temperature, retention time in a reactor, and internal pressure.

According to an embodiment of the present invention, the secondary spray drying may be performed in a temperature range of 20° C. to 350° C., but it is advantageous to perform the secondary spray drying at a temperature as low as possible for the densification of the first secondary particles.

Furthermore, the secondary sintering may be performed in a temperature range of 700° C. to 800° C. The secondary sintering, for example, may be performed in an atmosphere of an inert gas such as Ar or $N_2$.

Also, in the method of preparing the cathode active material according to the embodiment of the present invention, the first and second spray solutions may further include a cellulose-based dispersant to increase the dispersion thereof.

A cellulose-based dispersant typically used in the art may be used as the cellulose-based dispersant and for example, may include any one selected from the group consisting of carboxymethyl cellulose, carboxyethyl cellulose, aminoethyl cellulose, and oxyethyl cellulose, or a mixture of two or more thereof.

The dispersant may be used in an amount of 1 part by weight to 10 parts by weight based on 100 parts by weight of the lithium transition metal phosphate.

The present invention provides a cathode including the cathode active material.

According to an embodiment of the present invention, a method of preparing the cathode may include: forming a cathode active material coating layer by coating a cathode collector with a cathode active material composition comprising the cathode active material and a binder mixed therein and drying the cathode collector; and rolling the cathode active material coating layer.

According to an embodiment of the present invention, the rolling, for example, may be performed using a roll press by a typical method used in the art.

Also, in the cathode active material according to the embodiment of the present invention, since the rolling is performed on the first secondary particles, the secondary particles may not be picked up by a roller during the rolling according to the appropriate diameter of the secondary particles. Thus, processability of the electrode may be improved.

That is, according to an embodiment of the present invention, since the first secondary particles and the second secondary particles are fractured by the roll press during the rolling when the cathode active material is used in the cathode, the shape of the first secondary particles and the second secondary particles may disappear and the first secondary particles and the second secondary particles may respectively become primary particles.

According to an embodiment of the present invention, thicknesses of the cathode active material coating layer before and after the rolling may be different from each other.

According to an embodiment of the present invention, the thickness of the cathode active material coating layer after the rolling may be smaller than the thickness of the cathode active material coating layer before the rolling. For example, the thickness of the cathode active material coating layer before the rolling may be in a range of 80 µm to 200 µm, and the thickness of the cathode active material coating layer after the rolling may be in a range of 20 µm to 80 µm.

Also, the thickness of the cathode active material coating layer after the rolling may be smaller than the thickness of the cathode active material coating layer before the rolling, and for example, may be in a range of 45 µm to 70 µm. However, the present invention is not limited thereto.

The binder is a component that assists the binding between an active material and a conductive agent, and the binding with a current collector. The binder is typically added in an amount of 1 wt % to 30 wt % based on a total weight of the cathode active material composition. Examples of the binder may be any one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), and a fluorine rubber, or a mixture of two or more thereof.

The conductive agent may be typically added in an amount of 0.05 wt % to 5 wt % based on the total weight of the cathode active material composition. Any conductive agent may be used without particular limitation so long as it has suitable conductivity without causing side reactions with other elements of the battery. For example, the conductive agent may include a conductive material such as: graphite such as natural graphite and artificial graphite; carbon black such as super-p, acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

A lithium secondary battery according to an embodiment of the present invention includes the cathode, an anode, and a separator disposed between the cathode and the anode.

In the anode, a carbon material, lithium metal, silicon, or tin, which may intercalate and deintercalate lithium ions, may be typically used as an anode active material. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Similar to the cathode, any binder typically used in the art may be used as a binder for the anode. An anode active material and the above additives are mixed and stirred to prepare an anode active material composition. Then, a current collector is coated therewith and pressed to prepare the anode.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

A shape of the lithium secondary battery of the present invention is not particularly limited, and for example, a cylindrical type using a can, a prismatic type, a pouch type, or a coin type may be used.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Hereinafter, the present invention will be described in more detail, according to examples and experimental examples. However, the present invention is not limited thereto.

<Preparation of Cathode Active Material>

Example 1

Step (i) Preparation of Second Secondary Particles

A mixed solution was prepared in which ammonia water was added to a mixture of 1.5 mole of lithium aqueous solution ($LiOH.H_2O$) and a ferrous sulfate aqueous solution containing 0.5 mole of iron sulfate ($FeSO_4.7H_2O$), 0.55 mole of phosphoric acid ($P_2O_5$), and an antioxidant to adjust a pH value in a range of 5.5 to 7. The mixed solution was introduced at a constant rate through a continuous supercritical reactor under conditions of a temperature of about 375° C. to about 450° C. and a pressure of 250 bar to 300 bar to prepare a $LiFePO_4$ solution as lithium iron phosphate during a reaction time of a few seconds.

The $LiFePO_4$ solution was filtered to obtain lithium iron phosphate particles. Purity of the lithium iron phosphate particles was analyzed by x-ray diffraction (XRD) analysis and primary particles were analyzed by a scanning electron microscope (SEM).

The washed lithium iron phosphate was reslurried in distilled water, and sucrose as a first carbon precursor was then added to the above solution in an amount of 4 parts by weight based on 100 parts by weight of the lithium iron phosphate to obtain a first spray solution. The first spray solution including the lithium iron phosphate solution having the sucrose added thereto was provided into a chamber of a spray dryer (by EIN SYSTEMS, Co., Ltd.). Then, the first spray solution was sprayed in the chamber and dried. In this case, the spray drying was performed under conditions including a drying temperature of 130° C., an internal pressure of −20 mbar, and a flow rate of 45 ml/min, and second secondary particles formed by the agglomeration of second primary particles of lithium iron phosphate ($LiFePO_4$) were then obtained by primary sintering at 200° C. in air.

Step (ii) Preparation of First Secondary Particles Respectively Including the Second Secondary Particle Therein The second secondary particles, lithium iron phosphate, carboxymethyl cellulose as a dispersant, sucrose as a second carbon precursor, and pure water were mixed and stirred to obtain a second spray solution.

In this case, a weight ratio of the second secondary particles to the lithium iron phosphate was 1:1, and the lithium iron phosphate was used in an amount of about 20 parts by weight based on 100 parts by weight of the pure water. Also, the sucrose and the carboxymethyl cellulose were respectively used in an amount of 4 parts by weight based on 100 parts by weight of the lithium iron phosphate.

The second spray solution was provided into a chamber of a spray dryer (by EIN SYSTEMS, Co., Ltd.). Then, the second spray solution was sprayed in the chamber and dried. In this case, the spray drying was performed under conditions including a drying temperature of 95° C. to 115° C., an internal pressure of −20 mbar, and a flow rate of 40 ml/min, and first secondary particles respectively including the second secondary particle therein and formed by the agglomeration of first primary particles were then obtained by secondary sintering at 700° C. in air.

Comparative Example 1

A mixed solution was prepared in which ammonia water was added to a mixture of 1.5 mole of lithium aqueous solution ($LiOH.H_2O$) and a ferrous sulfate aqueous solution containing 0.5 mole of iron sulfate ($FeSO_4.7H_2O$), 0.55 mole of phosphoric acid ($P_2O_5$), and an antioxidant to adjust a pH value in a range of 5.5 to 7. The mixed solution was introduced at a constant rate through a continuous supercritical reactor under conditions of a temperature of about 375° C. to about 450° C. and a pressure of 250 bar to 300 bar to prepare a $LiFePO_4$ solution as lithium iron phosphate during a reaction time of a few seconds.

The $LiFePO_4$ solution was filtered to obtain lithium iron phosphate particles. Purity of the lithium iron phosphate particles was analyzed by XRD analysis and primary particles were analyzed by a SEM.

The washed lithium iron phosphate was reslurried in distilled water, and sucrose as a first carbon precursor was then added to the above solution in an amount of 4 parts by weight based on 100 parts by weight of the lithium iron phosphate to obtain a spray solution. The spray solution including the lithium iron phosphate solution having the sucrose added thereto was provided into a chamber of a spray dryer (by EIN SYSTEMS, Co., Ltd.). Then, the spray solution was sprayed in the chamber and dried. In this case, the spray drying was performed under conditions including a drying temperature of 130° C., an internal pressure of −20 mbar, and a flow rate of 15 ml/min, and lithium iron phosphate having secondary particles, which were formed by the agglomeration of primary particles of lithium iron phosphate ($LiFePO_4$), was then obtained by sintering at 700° C. in air.

TABLE 1

| Examples | Average particle diameter[1] of first primary particles (nm) | Average particle diameter[1] of first secondary particles (μm) | Average particle diameter[1] of second primary particles (nm) | Average particle diameter[1] of second secondary particles (μm) | Internal porosity[2] (%) |
|---|---|---|---|---|---|
| Example 1 | 220 | 16 | 40 | 9 | 35 |
| Comparative Example 1 | 40 | 15 | x | x | 35 |

1. Average particle diameter: laser diffraction method (Microtac MT 3000)
2. Internal porosity=volume of pores per unit mass/(specific volume+volume of pores per unit mass)
(use BELSORP (BET instrument) by BEL Japan Inc., use values calculated by the Barrett-Joyner-Halenda (BJH) method, i.e., a mesopore measurement method)

<Preparation of Lithium Secondary Battery>

Example 2

Cathode Preparation

A cathode active material composition was prepared by adding 90 wt % of the cathode active material prepared in Example 1, 5 wt % of carbon black as a conductive agent, and 5 wt % of polyvinylidene fluoride (PVdF) as a binder to N-methyl-2-pyrrolidone (NMP) as a solvent. An about 20 μm thick aluminum (Al) thin film as a cathode collector was coated with the cathode active material composition and dried, and the Al thin film was then roll-pressed to prepare a cathode.

Anode Preparation

An anode active material composition was prepared by mixing 96.3 wt % of carbon powder as an anode active material, 1.0 wt % of super-p as a conductive agent, and 1.5 wt % of styrene-butadiene rubber (SBR) and 1.2 wt % of carboxymethyl cellulose (CMC) as a binder, and adding the mixture to NMP as a solvent. A 10 μm thick copper (Cu) thin film as an anode collector was coated with the anode active material composition and dried, and the Cu thin film was then roll-pressed to prepare an anode.

Non-Aqueous Electrolyte Solution Preparation

A 1 M LiPF$_6$ non-aqueous electrolyte solution was prepared by adding LiPF$_6$ to a non-aqueous electrolyte solvent that was prepared by mixing ethylene carbonate and diethyl carbonate, as an electrolyte, at a volume ratio of 30:70.

Lithium Secondary Battery Preparation

A mixed separator of polyethylene and polypropylene was disposed between the cathode and anode thus prepared, and a polymer type battery was then prepared by a typical method. Then, the preparation of each lithium secondary battery was completed by injecting the prepared non-aqueous electrolyte solution.

Comparative Example 2

A lithium secondary battery was prepared in the same manner as in Example 1 except that the cathode active material prepared in Comparative Example 1 was used.

Experimental Example 1

<Charge and Discharge Characteristics>

Charge and discharge characteristics of the lithium secondary batteries obtained in Example 2 and Comparative Example 2 were measured. In the initial $6^{th}$ cycle, the lithium secondary batteries prepared in Example 2 and Comparative Example 2 were charged at 0.2 C to 4.2 V under constant current/constant voltage (CC/CV(2%)) conditions. Thereafter, the lithium secondary batteries were discharged at a CC of 2.0 C to a voltage of 2.5 V vs. Li/Li$^+$, and the charge and discharge were then terminated. The results thereof are presented in Table 2 below.

Experimental Example 2: Adhesion Measurement

Adhesion measurement was performed on the cathodes prepared in Example 2 and Comparative Example 2. The adhesion measurement was performed using a generally known 180-degree peel test. The results thereof are presented in Table 2 below.

TABLE 2

| Examples | Capacity retention ratio (2 C/0.1 C) (%) | Adhesion (gf) |
| --- | --- | --- |
| Example 2 | 92 | 22 |
| Comparative Example 2 | 90 | 9 |

As illustrated in Table 2, a capacity retention ratio of Example 2 of the present invention was 92% and a capacity retention ratio of Comparative Example 2 was 90%. Thus, it may be understood that the capacity retention ratio of Example 2 was improved by about 2% in comparison to that of Comparative Example 2.

With respect to the cathode obtained in Example 2, adhesion to the cathode collector was 22 gf, and with respect to the cathode obtained in Comparative Example 2, adhesion to the cathode collector was 9 gf. Thus, it may be understood that the adhesion of Example 2 was improved by 10 times or more in comparison to that of Comparative Example 2.

INDUSTRIAL APPLICABILITY

In a cathode active material according to an embodiment of the present invention, since first primary particles and second primary particles having different average particle diameters are included, the exfoliation of the cathode active material from a cathode collector may be minimized and performance characteristics, such as high output characteristics and an increase in available capacity, of a secondary battery may be further improved. Thus, the cathode active material may be suitable for a secondary battery.

The invention claimed is:

1. A method of preparing a cathode active material, the method comprising:
   (i) preparing second secondary particles of lithium transition metal phosphate by primary spray drying and primary sintering a first spray solution including first lithium transition metal phosphate, a first carbon precursor, and water in a spray chamber; and
   (ii) preparing first secondary particles of lithium transition metal phosphate respectively including the second secondary particle therein by secondary spray drying and secondary sintering a second spray solution including the second secondary particles, second lithium transition metal phosphate, a second carbon precursor, and water in a spray chamber,
   wherein the first secondary particle is formed by agglomeration of two or more first primary particles and is porous, and the second secondary particle is formed by agglomeration of two or more second primary particles whereby a porous portion is created between the first primary particles and the second primary particles, and
   wherein the cathode active material further comprises a carbon coating layer on the first primary particles and the second primary particles.

2. The method of claim 1, wherein the secondary sintering is performed in a temperature range of 700° C. to 800° C.

3. The method of claim 1, wherein the primary spray drying and the secondary spray drying are performed in a temperature range of 20° C. to 350° C.

4. The method of claim 1, wherein the first and second carbon precursors are saccharides.

5. The method of claim 4, wherein the saccharides comprise a solution including any one selected from the group consisting of glucose, fructose, galactose, sucrose, maltose, and lactose, or a mixture of two or more thereof.

6. The method of claim 1, wherein the first and second carbon precursors are used in an amount of 1 part by weight to 40 parts by weight based on 100 parts by weight of the lithium transition metal phosphate.

7. The method of claim 1, wherein the first and second spray solutions further comprise a cellulose-based dispersant.

8. The method of claim 7, wherein the cellulose-based dispersant comprises any one selected from the group consisting of carboxymethyl cellulose, carboxyethyl cellulose, aminoethyl cellulose, and oxyethyl cellulose, or a mixture of two or more thereof.

9. The method of claim 7, wherein the dispersant is used in an amount of 1 part by weight to 10 parts by weight based on 100 parts by weight of the lithium transition metal phosphate.

10. A method of preparing a cathode active material, the method comprising:
    (i) preparing second secondary particles of lithium transition metal phosphate by primary spray drying and primary sintering a first spray solution including first lithium transition metal phosphate, a first carbon precursor, and water in a spray chamber; and (ii) preparing first secondary particles of lithium transition metal phosphate respectively including the second secondary particle therein by secondary spray drying and secondary sintering a second spray solution including the second secondary particles, second lithium transition metal phosphate, a second carbon precursor, and water in a spray chamber wherein the first secondary particle is formed by agglomeration of two or more first primary particles, and the second secondary particle is formed by agglomeration of two or more second primary particles, wherein the cathode active material further comprises a carbon coating layer on the first primary particles and the second primary particles, wherein a total solid content (TSC) of the second secondary particles is in a range of 25% to 40%.

11. A method of preparing a cathode active material, the method comprising:

(i) preparing second secondary particles of lithium transition metal phosphate by primary spray drying and primary sintering a first spray solution including first lithium transition metal phosphate, a first carbon precursor, and water in a spray chamber; and (ii) preparing first secondary particles of lithium transition metal phosphate respectively including the second secondary particle therein by secondary spray drying and secondary sintering a second spray solution including the second secondary particles, second lithium transition metal phosphate, a second carbon precursor, and water in a spray chamber wherein the first secondary particle is formed by agglomeration of two or more first primary particles, and the second secondary particle is formed by agglomeration of two or more second primary particles, wherein the cathode active material further comprises a carbon coating layer on the first primary particles and the second primary particles, wherein a total solid content [TSC] of the first secondary particles is in a range of 10% to 20%.

12. A method of preparing a cathode active material, the method comprising:

(i) preparing second secondary particles of lithium transition metal phosphate by primary spray drying and primary sintering a first spray solution including first lithium transition metal phosphate, a first carbon precursor, and water in a spray chamber; and (ii) preparing first secondary particles of lithium transition metal phosphate respectively including the second secondary particle therein by secondary spray drying and secondary sintering a second spray solution including the second secondary particles, second lithium transition metal phosphate, a second carbon precursor, and water in a spray chamber wherein the first secondary particle is formed by agglomeration of two or more first primary particles, and the second secondary particle is formed by agglomeration of two or more second primary particles, wherein the cathode active material further comprises a carbon coating layer on the first primary particles and the second primary particles, wherein a ratio of the second secondary particles to the second lithium transition metal phosphate is in a range of 1:0.3 to 1:5 as a weight ratio.

13. A method of preparing a cathode active material, the method comprising:

(i) preparing second secondary particles of lithium transition metal phosphate by primary spray drying and primary sintering a first spray solution including first lithium transition metal phosphate, a first carbon precursor, and water in a spray chamber; and (ii) preparing first secondary particles of lithium transition metal phosphate respectively including the second secondary particle therein by secondary spray drying and secondary sintering a second spray solution including the second secondary particles, second lithium transition metal phosphate, a second carbon precursor, and water in a spray chamber wherein the first secondary particle is formed by agglomeration of two or more first primary particles, and the second secondary particle is formed by agglomeration of two or more second primary particles wherein the cathode active material further comprises a carbon coating layer on the first primary particles and the second primary particles, wherein the primary sintering is performed in a temperature range of 150° C. to 300° C.

14. A method of preparing a cathode active material, the method comprising:

(i) preparing second secondary particles of lithium transition metal phosphate by primary spray drying and primary sintering a first spray solution including first lithium transition metal phosphate, a first carbon precursor, and water in a spray chamber; and (ii) preparing first secondary particles of lithium transition metal phosphate respectively including the second secondary particle therein by secondary spray drying and secondary sintering a second spray solution including the second secondary particles, second lithium transition metal phosphate, a second carbon precursor, and water in a spray chamber wherein the first secondary particle is formed by agglomeration of two or more first primary particles, and the second secondary particle is formed by agglomeration of two or more second primary particles, wherein the cathode active material further comprises a carbon coating layer on the first primary particles and the second primary particles, wherein the second spray solution is spray-dried in a flow rate range of 10 ml/min to 90 ml/min.

* * * * *